United States Patent
Chan et al.

(10) Patent No.: US 12,400,367 B2
(45) Date of Patent: Aug. 26, 2025

(54) CAMERA CALIBRATION METHOD BASED ON VEHICLE LOCALIZATION

(71) Applicant: Industrial Technology Research Institute, Hsinchu (TW)

(72) Inventors: Chiao-Tung Chan, Hsinchu (TW); Chen-Hui Hu, Miaoli County (TW); Daniel Alberto Reyes Uquillas, Hsinchu (TW); Sheng-Wei Chan, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 132 days.

(21) Appl. No.: 18/539,374

(22) Filed: Dec. 14, 2023

(65) Prior Publication Data
US 2025/0200803 A1    Jun. 19, 2025

(51) Int. Cl.
*G06T 7/80* (2017.01)
*H04N 17/00* (2006.01)
*H04N 23/90* (2023.01)

(52) U.S. Cl.
CPC ............. *G06T 7/80* (2017.01); *H04N 17/002* (2013.01); *H04N 23/90* (2023.01); *G06T 2207/30244* (2013.01); *G06T 2207/30252* (2013.01)

(58) Field of Classification Search
CPC ............. G06T 7/80; G06T 2207/30244; G06T 2207/30252; H04N 23/90; H04N 17/002
See application file for complete search history.

(56) References Cited

U.S. PATENT DOCUMENTS

| | | | |
|---|---|---|---|
| 6,594,600 B1 * | 7/2003 | Arnoul | G06T 7/85 |
| | | | 702/94 |
| 8,150,143 B2 * | 4/2012 | Chen | G06T 7/80 |
| | | | 345/178 |

(Continued)

FOREIGN PATENT DOCUMENTS

| | | |
|---|---|---|
| CN | 104019829 A | 9/2014 |
| CN | 110967038 A | 4/2020 |

(Continued)

OTHER PUBLICATIONS

Longitudinal Improvement for Self-Localization Based on Mono-Camera and Traffic Signs, 2018.
Semantic Segmentation-Based Lane Level Localization Using Around View Monitoring System, 2019.
A Light-Weight Semantic Map for Visual Localization towards Autonomous Driving, 2021.

(Continued)

*Primary Examiner* — Ramsey Refai

(57) ABSTRACT

The present disclosure provides a camera calibration method based on vehicle localization, mainly considering that a vehicle is not of an ideal rigid structure, and shaking of a vehicle body during operation, uneven road surfaces, or different loads will cause variations in extrinsic parameters of a camera system, resulting in perceptual information errors. Therefore, through perceptual information from a fused image, an inertial measurement unit, a speedometer, and the like, combined with the road and marking information provided by a high-definition map, the relative motion between the vehicle body and a vehicle chassis is simultaneously described with a mass-spring-damper model, so as to complete the determination of six-degree-of-freedom positions of the vehicle body and the vehicle chassis, and finally the extrinsic parameters of cameras are immediately calibrated with the vehicle chassis as reference coordinates.

7 Claims, 2 Drawing Sheets

(56) References Cited

U.S. PATENT DOCUMENTS

| | | |
|---|---|---|
| 8,842,181 B2 | 9/2014 | Kosaki |
| 10,565,736 B2 | 2/2020 | Oba et al. |
| 10,694,175 B2 | 6/2020 | Bovyrin et al. |
| 10,798,303 B1* | 10/2020 | Camyre .................. G01S 17/06 |
| 10,919,458 B2 | 2/2021 | Gupta et al. |
| 11,428,541 B1 | 8/2022 | Khalili et al. |
| 2010/0165116 A1* | 7/2010 | Hsieh ................... H04N 5/2224 |
| | | 348/187 |
| 2010/0238291 A1* | 9/2010 | Pavlov ..................... G06T 7/73 |
| | | 348/148 |
| 2010/0315505 A1* | 12/2010 | Michalke ............... G06T 7/251 |
| | | 348/118 |
| 2013/0293717 A1 | 11/2013 | Zhang et al. |
| 2017/0134722 A1 | 5/2017 | Okouneva |
| 2020/0329215 A1 | 10/2020 | Tsunashima |
| 2021/0327092 A1 | 10/2021 | Jiang et al. |
| 2022/0381557 A1 | 12/2022 | Rogers et al. |

FOREIGN PATENT DOCUMENTS

| | | |
|---|---|---|
| CN | 113658252 A | 11/2021 |
| CN | 115943636 A | 4/2023 |
| TW | I424259 | 1/2014 |
| WO | 2023232318 A1 | 12/2023 |

OTHER PUBLICATIONS

Monocular Vehicle Self-localization method based on Compact Semantic Map, 2018.
LaneMatch: A Practical Real-Time Localization Method Via Lane-Matching, 2022.
Lane-level localization system using surround-view cameras adaptive to different driving conditions, 2020.
Advances in Real-Time Online Vehicle Camera Calibration via Road Line Markings Parallelism Enforcement, 2022.

* cited by examiner

CAMERA CALIBRATION METHOD BASED ON VEHICLE LOCALIZATION

CROSS-REFERENCE TO RELATED APPLICATION

The present application is based on, and claims priority from, Taiwan (International) Application Serial Number 112148663, filed on Dec. 14, 2023, the disclosure of which is hereby incorporated by reference herein in its entirety.

TECHNICAL FIELD

The present disclosure belongs to a camera calibration method based on vehicle localization, and relates to a dynamic camera calibration method applying high-definition map information and localization, and is used for achieving the function of combining visual-based localization and dynamic camera calibration.

BACKGROUND

An operation mode of a self-driving vehicle (an autonomous vehicle) is mainly to configure various sensors in different positions of the self-driving vehicle according to different application requirements, enabling the sensors to detect various driving information when the self-driving vehicle travels, to provide reference for a self-driving system to plan control commands, and then to manipulate the self-driving vehicle to stably travel.

However, the self-driving vehicle is actually of a non-rigid structure composed of multiple parts, the significance of which lies in the fact that when the self-driving vehicle moves, all the parts of the self-driving vehicle will relatively move, and the relative displacement of the different parts may cause the different sensors thereon to shake. For example, depending on vehicle models, a head portion of a trailer will sway significantly during traveling; and a cargo van will have different body heights due to different loads. In addition, uneven road surfaces may also cause a vehicle body to sway, which may result in sensing errors of the sensors.

Such shaking and uneven road surfaces cause the sensors to offset from 6D position parameters, a.k.a. extrinsic parameters, set by the self-driving system, resulting in errors in detecting motion states of surrounding objects by the self-driving vehicle, such as relative distances and speeds of the surrounding objects to the self-driving vehicle. The errors in the estimation of positions of the surrounding objects of the self-driving vehicle are prone to leading to the inability of the self-driving system to calculate the most appropriate control commands, which may result in a relatively large speed and acceleration variation of the self-driving vehicle due to large variations in the states of the objects, or even collisions between the self-driving vehicle and other objects.

Taking an existing self-driving system or ADAS as an example, it usually uses cameras assembled on the vehicle body to obtain the positions of the surrounding objects, which serve as extrinsic parameters set by the self-driving system through an image-based object detection and localization method. However, because the body of the vehicle is actually connected to a vehicle chassis through a suspension system rather than a rigid structure, extrinsic parameters of six-degree-of-freedom positions of the cameras configured on the vehicle body relative to a camera at a reference point of coordinates of the vehicle chassis are susceptible to variations due to the swaying of the vehicle body, the different loads, and the tilting of the road surfaces, which may result in variations of rotation angles and displacements of the cameras relative to the vehicle chassis, leading to errors in distances between the objects detected based on images and the vehicle and, consequently, possibly causing the malfunctioning of the self-driving system or the ADAS.

SUMMARY

An embodiment of the present disclosure provides a camera calibration method based on vehicle localization, which combines vehicle chassis localization with multi-sensor fusion and visual-based vehicle body localization, coupled with operation of dynamic model iteration of a vehicle body and a vehicle chassis, to complete determination of six-degree-of-freedom positions of the vehicle body and vehicle chassis, and to calibrate extrinsic parameters of cameras with the vehicle chassis as reference coordinates.

An embodiment of the present disclosure provides the vehicle chassis localization with multi-sensor fusion referred to obtaining speed information of the chassis of a vehicle, a speed and acceleration of a three-dimensional displacement of the vehicle chassis, and an angular speed and angular acceleration of a three-dimensional rotation angle of the vehicle chassis, to estimate a current initial six-degree-of-freedom position of the chassis of the vehicle.

An embodiment of the present disclosure provides the image-based vehicle body localization referred to using an surround view cameras to obtain an around view image of an vicinity of the body of the vehicle, detecting an image object feature point set in the image and vanishing points of all the cameras of the surround view cameras, and matching the same with a semantic map feature point set of the vicinity of the vehicle, to calculate six-degree-of-freedom positions of all the cameras.

An embodiment of the present disclosure provides iterative approach of a relative motion model of the vehicle body and the vehicle chassis referred to estimating a three-dimensional relative displacement between the vehicle body and the vehicle chassis by using a mass-spring-damper model, iteratively and finely adjusting the six-degree-of-freedom position of the vehicle chassis with reference to a road surface normal vector and the rotation angle of the vehicle chassis, to complete the determination of the six-degree-of-freedom positions of the vehicle body and the vehicle chassis, and finally calibrating the extrinsic parameters of the cameras with the vehicle chassis as reference coordinates.

Figure 1:
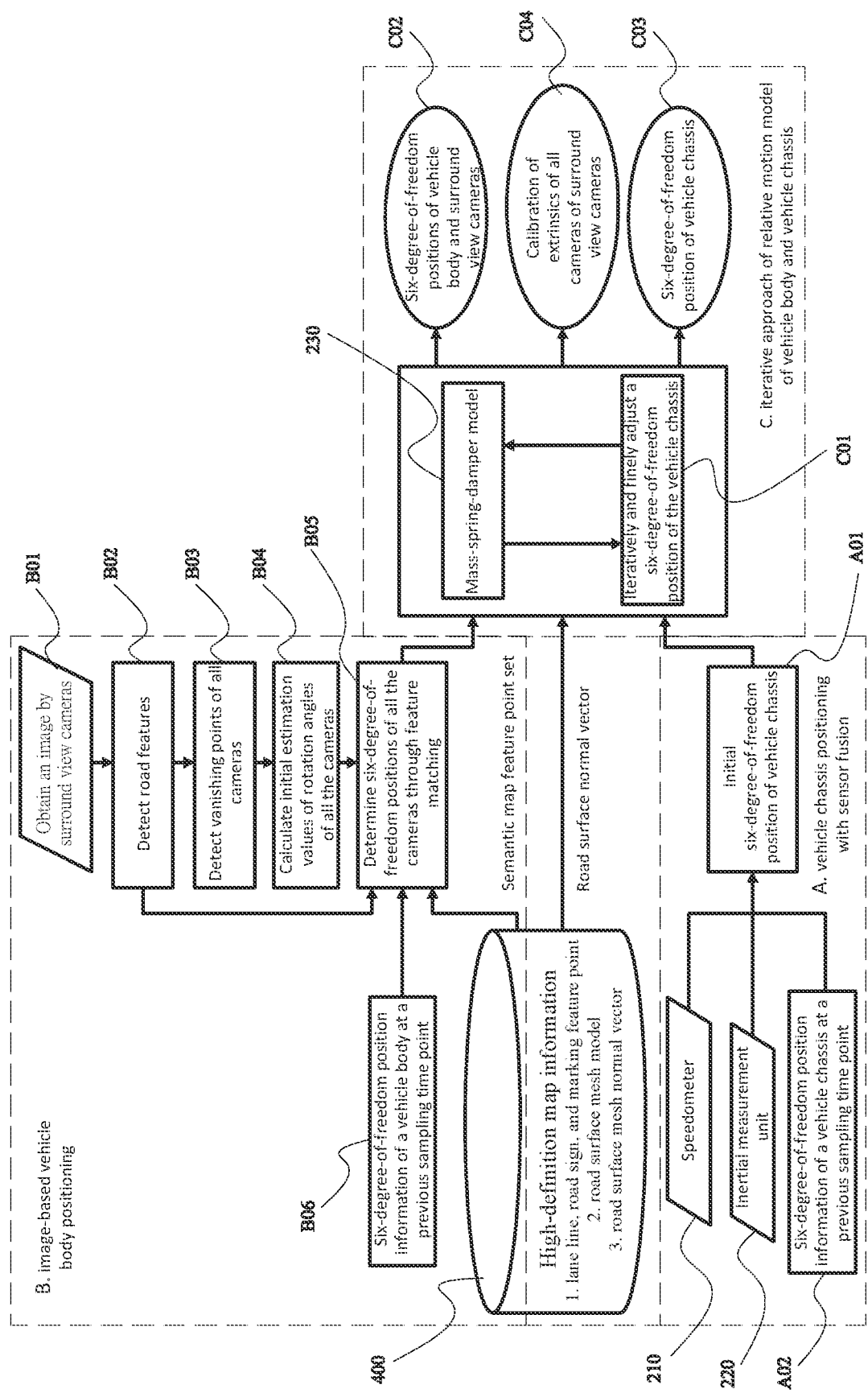
FIG. 1 is a workflow chart of a dynamic camera calibration method according to an embodiment of the present disclosure.

DESCRIPTION OF SIGNS OF MAIN COMPONENTS 100 vehicle
110 vehicle body 120 vehicle chassis
210 speedometer
220 inertial measurement unit
230 mass-spring-damper model
300 surround view cameras
310 camera
400 high-definition map information

DETAILED DESCRIPTION

Below, exemplary embodiments of the present disclosure will be described in detail with reference to accompanying drawings so that the features of the present disclosure can be more readily understood by those skilled in the art.

Figure 2:
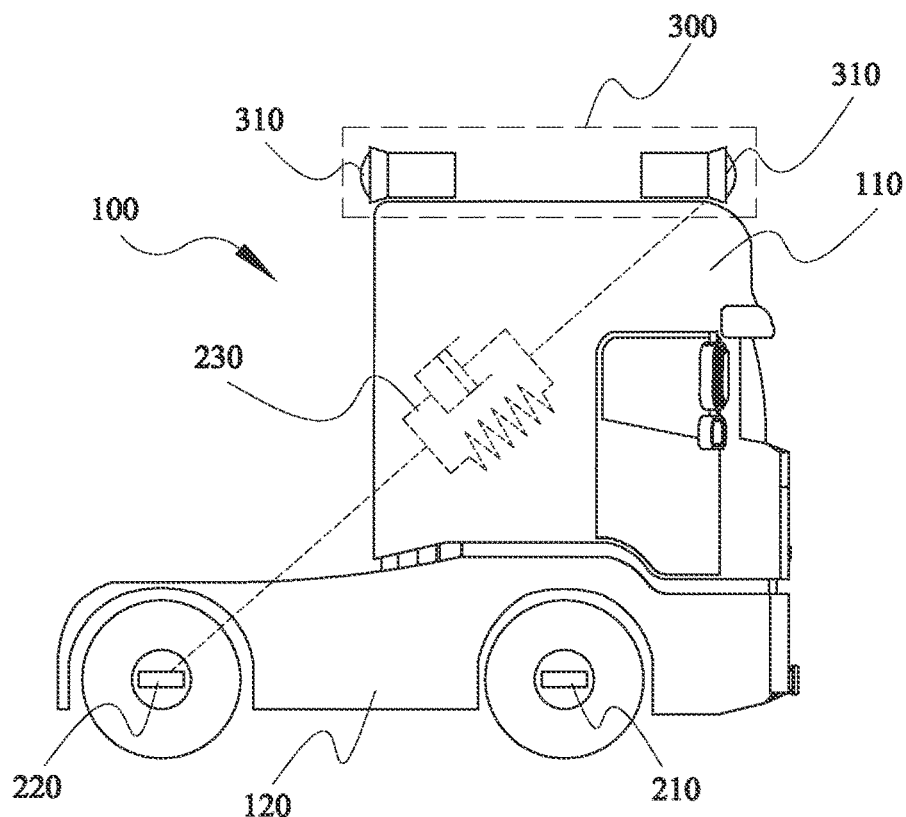
FIG. 2 is a front view of a structure of a vehicle sensor configuration according to an embodiment of the present disclosure, with a vehicle model shown for reference only.
Figure 3:
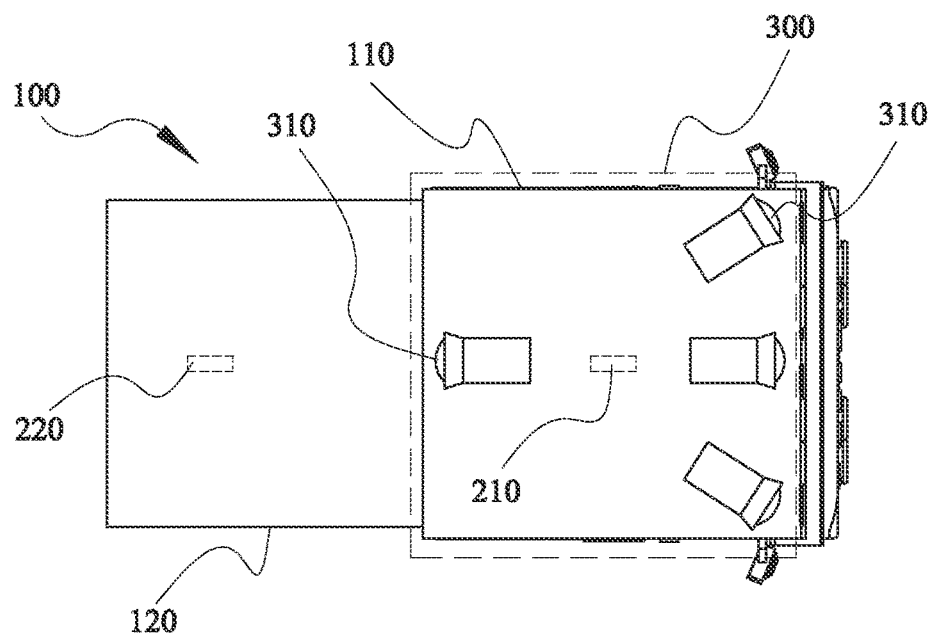
FIG. 3 is a top view of a structure of a vehicle sensor configuration according to an embodiment of the present disclosure, with a vehicle model shown for reference only.

Reference is made to FIG. 1, which is a camera calibration method based on vehicle localization provided by the present disclosure. A system architecture of the dynamic camera calibration method, as shown in FIGS. 2 and 3, includes a vehicle 100. The vehicle 100 has an upper half portion of a vehicle body 110 and a lower half portion of a vehicle chassis 120. The vehicle chassis 120 is provided with a speedometer 210 and an inertial measurement unit 220, and the vehicle body 110 is provided with an surround view cameras 300. The surround view cameras 300 includes a plurality of cameras 310, which are dispersed on the periphery of the vehicle body to obtain surrounding view images. In addition, a mass-spring-damper model 230 is connected between the vehicle body 110 and the vehicle chassis 120, and the mass-spring-damper model 230 calculates the variation in elongation of the mass-spring-damper model with the vehicle chassis 120 as reference coordinates, so as to estimate a three-dimensional relative displacement between the vehicle body 110 and the vehicle chassis 120.

With the above structural composition, the dynamic camera 310 correction method at least includes the following steps:

Step A: through localization of the vehicle chassis 120 with multi-sensor (e.g. the speedometer 210, and the inertial measurement unit 220) fusion, estimate an initial six-degree-of-freedom position, speed and acceleration of the vehicle chassis 120;

Step B: through visual-based localization of the vehicle body 110, apply a semantic map feature points to match with detected features of the surround view cameras 300, so as to calculate determination of six-degree-of-freedom positions of all the cameras 310; and Step C: through iterative approach of a relative motion model of the vehicle body 110 and the vehicle chassis 120, complete determination of six-degree-of-freedom positions of the vehicle body 110 and vehicle chassis 120, and finally calibrate extrinsic parameters of all the cameras 310 with the vehicle chassis 120 as reference coordinates.

Based on the above, the detailed workflow of the present disclosure is described as follows.

As for the localization of the vehicle chassis 120 with multi-sensor (e.g. the speedometer 210, and the inertial measurement unit 220) fusion (step A), it is required to use the speedometer 210 to sense speed information of the vehicle chassis 120 and use the inertial measurement unit 220 to obtain a speed and acceleration of a three-dimensional displacement of the vehicle chassis 120, and an angular speed and angular acceleration of a three-dimensional rotation angle of the vehicle chassis 120, to estimate the current initial six-degree-of-freedom position of the chassis 120 of the vehicle 100 (step A01).

As for the visual-based localization of the vehicle body 110 (step B), the surround view cameras 300 are used to obtain surround view images of the body 110 of the vehicle 100. The image-detected stop lines, pedestrian crossings, other road markers, and image features (step B01) composes an image object feature point set (step B02). Vanishing points of all the cameras 310 of the surround view cameras 300 are calculated from the feature point set (step B03). The Initial estimation values of rotation angles of all the cameras 310 are calculated based on the vanishing points (step B04) and the feature point set match with the semantic map feature point set of the vicinity of the vehicle 100 queried from high-definition map information 400 to calculate the six-degree-of-freedom positions of all the cameras 310 (step B05).

Then, the iterative approach of the relative motion model of the vehicle body 110 and the vehicle chassis 120 is conducted (step C), the three-dimensional relative displacement between the vehicle body 110 and the vehicle chassis 120 is estimated by using the mass-spring-damper model 230, the six-degree-of-freedom position of the vehicle chassis 120 is iteratively and finely adjusted with reference to the road surface normal vector and the rotation angle of the vehicle chassis 120 (step C01), to complete the determination of six-degree-of-freedom positions of the vehicle body 110 and the surround view cameras 300 thereon (step C02) as well as the determination of the six-degree-of-freedom position of the vehicle chassis 120 (step C03), and finally, the extrinsic parameters of all the cameras 310 of the surround view cameras 300 are calibrated with the vehicle chassis 120 as reference coordinates (step C04).

In the foregoing method, the current initial six-degree-of-freedom position of the vehicle chassis 120 may further be estimated by using speed and acceleration information of the vehicle 100 calculated by the speedometer 210 and the inertial measurement unit 220, and taking a position of the vehicle chassis 120 at a previous sampling time point as a reference point (step A03) to calculate a position of the vehicle chassis 120 at a current sampling time point. Similarly, as for estimation of the six-degree-of-freedom positions of all the cameras 310, the six-degree-of-freedom positions of all the cameras 310 at a current sampling time point may also be calculated by taking a position of the vehicle body 110 at a previous sampling time point as a reference point (step B06) when the image object feature point set and the semantic map feature point set are matched.

Moreover, the road surface normal vector is generated by querying the high-definition map (HD Map) information 400 according to the position of the vehicle chassis 120.

In addition, the semantic map feature point set of the vicinity of the vehicle 100 is generated by querying the high-definition map information 400 with the position of the vehicle chassis 120, and includes a set of a road marking edge and a traffic sign edge.

Besides, the vanishing points of all the cameras 310 of the surround view cameras 300 and the image object feature point set are calculated according to a plurality of image features in the around view image.

Furthermore, as for the six-degree-of-freedom extrinsic parameters of all the cameras 310 of the surround view cameras 300, pitch and yaw angles of each of the cameras 310 are calculated according to the vanishing points of the all cameras 310 in the surround view cameras 300; the all cameras 310 are configured on the vehicle body 110 and are in rigid connection with the vehicle body 110, and the pitch and yaw angles of the all cameras 310 are used for determining an initial value of a three-dimensional rotation angle of the vehicle body 110; and matching is conducted according to the semantic map feature point set of the vicinity of the vehicle 100 and the image object feature point set detected by the cameras 310 to calculate the six-degree-of-freedom positions of the cameras 310 and the six-degree-of-freedom position of the vehicle body 110.

In addition, the six-degree-of-freedom position of the vehicle body 110 and the six-degree-of-freedom position of the vehicle chassis 120 are iterated by, according to an initial value of the six-degree-of-freedom position of the vehicle body 110, an initial value of the six-degree-of-freedom position of the vehicle chassis 120, an initial value of the speed and acceleration of the vehicle chassis 120, and the road surface normal vector obtained by querying the high-definition map according to a position of the vehicle chassis 120, using the mass-spring-damper model to describe relative motion of the vehicle body 110 and the vehicle chassis 120, dynamic values of the mass-spring-damper model 230, including a position, a speed and an acceleration are continuously corrected, until an external force applied to the vehicle body 110 and the vehicle chassis 120 is approximate to a dynamic variation of the mass-spring-damper model and the six-degree-of-freedom position of the vehicle body 110 and the six-degree-of-freedom position of the vehicle chassis 120 are generated, and the six-degree-of-freedom extrinsic parameters of the cameras 310 of the surround view cameras 300 are calculated.

The embodiment disclosed above at least has the following characteristics.

As for a self-driving system or an ADAS, the mass-spring-damper model is introduced to describe the relative displacement between the vehicle body and the vehicle chassis, and the extrinsic parameters of the cameras are immediately calibrated with the vehicle chassis as reference coordinates, so as to solve the problem that due to shaking of the vehicle body during operation, uneven road surfaces, or different loads, the rotation angles and displacements of the cameras relative to the vehicle chassis are varied, thereby resulting in perception and localization errors, and to achieve the function of combining visual-based localization and dynamic camera calibration.

While the embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A camera calibration method based on vehicle localization, comprising:
obtaining a speed and acceleration of a three-dimensional displacement of a vehicle chassis and an angular speed and angular acceleration of a three-dimensional rotation angle of the vehicle chassis to estimate a current initial six-degree-of-freedom position of the chassis of a vehicle;
disposing an surround view cameras comprising a plurality of cameras on the vehicle, using the surround view cameras to obtain an around view image of an vicinity of a body of the vehicle, detecting an image object feature point set in the around view image and vanishing points of all the cameras of the surround view cameras, and matching with a semantic map feature point set of the vicinity of the vehicle, to calculate six-degree-of-freedom positions of all the cameras;
connecting a mass-spring-damper model between the vehicle body and the vehicle chassis, and estimating, by the mass-spring-damper model, a three-dimensional relative displacement between the vehicle body and the vehicle chassis with the surround view cameras as a reference point;
iterating the six-degree-of-freedom position of the vehicle chassis according to a road surface normal vector and the rotation angle of the vehicle chassis, to complete determination of six-degree-of-freedom positions of the vehicle body and the vehicle chassis; and
calibrating the six-degree-of-freedom positions of the cameras with the vehicle chassis as reference coordinates.

2. The camera calibration method based on vehicle localization according to claim 1, wherein the current initial six-degree-of-freedom position of the vehicle chassis is estimated by using speed and acceleration information of the vehicle calculated by a speedometer and an inertial measurement unit, and taking a position of the vehicle chassis at a previous sampling time point as a reference point to calculate a position of the vehicle chassis at a current sampling time point.

3. The camera calibration method based on vehicle localization according to claim 1, wherein the road surface normal vector is generated by querying high-definition map information according to a position of the vehicle chassis.

4. The camera calibration method based on vehicle localization according to claim 1, wherein the semantic map feature point set of the vicinity of the vehicle is generated by querying high-definition map information with a position of the vehicle chassis, and comprises a set of a road marking edge and a traffic sign edge.

5. The camera calibration method based on vehicle localization according to claim 1, wherein the vanishing points of all the cameras of the surround view cameras and the image object feature point set are calculated according to a plurality of image features in the surround-view images.

6. The camera calibration method based on vehicle localization according to claim 1, wherein as for the six-degree-of-freedom positions of all the cameras of the surround view cameras, pitch and yaw angles of each of the cameras are calculated according to the vanishing points of the plurality of cameras in the surround view cameras; the plurality of cameras are configured on the vehicle body and are in rigid connection with the vehicle body, and the pitch and yaw angles of the plurality of cameras are used for determining an initial value of a three-dimensional rotation angle of the vehicle body; and matching is conducted according to the semantic map feature point set of the vicinity of the vehicle and the image object feature point set detected by the cameras to calculate the six-degree-of-freedom positions of the cameras and the six-degree-of-freedom position of the vehicle body.

7. The camera calibration method based on vehicle localization according to claim 1, wherein the six-degree-of-freedom position of the vehicle body and the six-degree-of-freedom position of the vehicle chassis are iterated by, according to an initial value of the six-degree-of-freedom position of the vehicle body, an initial value of the six-degree-of-freedom position of the vehicle chassis, an initial value of the speed and acceleration of the vehicle chassis, and the road surface normal vector obtained by querying a high-definition map according to a position of the vehicle chassis, using a mass-spring-damper model to describe relative motion of the vehicle body and the vehicle chassis, dynamic values of the mass-spring-damper model, comprising a position, a speed and an acceleration are continuously corrected, until an external force applied to the vehicle body and the vehicle chassis is approximate to a dynamic variation of the mass-spring-damper model and the six-degree-of-freedom position of the vehicle body and the six-degree-of-freedom position of the vehicle chassis are generated, and the six-degree-of-freedom positions of the cameras of the surround view cameras are calculated.

\* \* \* \* \*